US009693244B2

(12) United States Patent
Maruhashi et al.

(10) Patent No.: US 9,693,244 B2
(45) Date of Patent: Jun. 27, 2017

(54) SENSOR AND RECEIVING DEVICE IN SENSOR SYSTEM

(75) Inventors: Kenichi Maruhashi, Tokyo (JP); Shingo Takahashi, Tokyo (JP); Noriyuki Itabashi, Tokyo (JP); Nobuhide Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 14/119,752

(22) PCT Filed: May 24, 2012

(86) PCT No.: PCT/JP2012/003394
§ 371 (c)(1),
(2), (4) Date: Nov. 22, 2013

(87) PCT Pub. No.: WO2012/160825
PCT Pub. Date: Nov. 29, 2012

(65) Prior Publication Data
US 2014/0098700 A1 Apr. 10, 2014

(30) Foreign Application Priority Data
May 25, 2011 (JP) ................................. 2011-116973

(51) Int. Cl.
*H04W 24/08* (2009.01)
*H04W 88/06* (2009.01)
(Continued)

(52) U.S. Cl.
CPC .......... *H04W 24/08* (2013.01); *H04L 12/403* (2013.01); *H04L 12/4035* (2013.01); *H04W 4/14* (2013.01);
(Continued)

(58) Field of Classification Search
CPC ............... H04L 12/403; H04L 12/4035; H04L 2012/4026; H04W 24/08; H04W 84/18
(Continued)

(56) References Cited

U.S. PATENT DOCUMENTS 5,680,059 A * 10/1997 Shiota ................ G01R 31/1227
324/547
2003/0067889 A1* 4/2003 Petite ..................... G01V 1/364
370/310
(Continued)

FOREIGN PATENT DOCUMENTS

| JP | 2006-187316 A | 7/2006 |
|---|---|---|
| JP | 2007-122175 A | 5/2007 |
| WO | WO-2006/070895 A1 | 7/2006 |

OTHER PUBLICATIONS

International Search Report issued for PCT/JP2012/003394, mailed Jul. 10, 2012, 2 pages.
(Continued)

*Primary Examiner* — Jae Y Lee
*Assistant Examiner* — Jean F Voltaire
(74) *Attorney, Agent, or Firm* — Wilmer Cutler Pickering Hale and Dorr LLP

(57) ABSTRACT

A sensor system in which it is possible to identify a sufficient number of sensors even in a situation where the data length of a packet is limited, as well as a sensor and a receiving device in the same, are provided. A sensor repeating a measurement period for performing measurement and a transmission period for performing transmission at predetermined cycles, includes: a measurement section (11) that outputs during the measurement period measurement information based on predetermined measurement; and a transmission section (12) that transmits during the transmission period, by using a single packet or a plurality of packets, source identification information for identifying a source of (Continued)

a packet, the measurement information, and sensor-related information for identifying the sensor and/or a measurement target equipment of this sensor.

8 Claims, 16 Drawing Sheets

(51) Int. Cl.

| | | |
|---|---|---|
| H04W 72/08 | (2009.01) | |
| H04W 24/00 | (2009.01) | |
| H04W 4/14 | (2009.01) | |
| H04L 12/403 | (2006.01) | |
| H04W 84/18 | (2009.01) | |
| H04W 28/04 | (2009.01) | |
| H04L 29/08 | (2006.01) | |
| H04L 12/40 | (2006.01) | |

(52) U.S. Cl.
CPC ......... *H04W 24/00* (2013.01); *H04W 72/082* (2013.01); *H04W 84/18* (2013.01); *H04W 88/06* (2013.01); *H04L 67/125* (2013.01); *H04L 2012/4026* (2013.01); *H04W 28/048* (2013.01)

(58) Field of Classification Search
USPC .................................................. 370/252, 474
See application file for complete search history.

(56) References Cited

U.S. PATENT DOCUMENTS

| | | | |
|---|---|---|---|
| 2004/0076183 A1* | 4/2004 | Kobbe ......................... 370/474 |
| 2007/0015465 A1* | 1/2007 | Giroud .............. G06K 19/0705 |
| | | | 455/41.2 |
| 2007/0133469 A1* | 6/2007 | Shin ..................... H04W 40/34 |
| | | | 370/331 |
| 2013/0024560 A1* | 1/2013 | Vasseur ................. H04L 41/142 |
| | | | 709/224 |

OTHER PUBLICATIONS

Mizutani, "Sensor no Network-ka eno Torikumi", Kikai Gijutsu, 48(12):55-59, Nov. 1, 2000, 7 pages.

Takahashi, et al., Real-Time Current-Waveform Sensor with Plugless Energy Harvesting from AC Power Lines for Home/Building Energy-Management Systems, 2011 IEEE International Solid-State Circuits Conference, pp. 220-221, Feb. 2011, 3 pages.

* cited by examiner

FIRST EXAMPLE

FIG. 10 THIRD EXAMPLE

FIG. 11 FOURTH EXAMPLE

SENSOR AND RECEIVING DEVICE IN SENSOR SYSTEM

CROSS-REFERENCE TO RELATED APPLICATIONS

This application is a national stage application of International Application No. PCT/JP2012/003394 entitled "Sensor and Receiving Device in Sensor System," filed on May 24, 2012, which claims the benefit of the priority of Japanese patent application No. 2011-116973, filed on May 25, 2011, the disclosures of each of which are hereby incorporated by reference in their entirety.

TECHNICAL FIELD

The present invention relates to a sensor system and, more particularly, to a sensor that transmits packets and a receiving device that receives the packets.

BACKGROUND ART

In recent years, studies for miniaturization and power saving of sensors have been conducted. In general, a sensor requires a power supply for operation, and in a case of using an external AC power supply, there is a difficulty in achieving miniaturization because a transformer and a rectifier capacitor are large. On the other hand, there are some sensors using button batteries, but butteries require maintenance such as changing, and therefore a problem also arises assuming that they are mounted inside electrical equipment.

A sensor that resolves such difficulties has been proposed in NPL 1. This sensor utilizes energy harvesting, by which energy is derived from the surroundings of AC power lines, and uses a TDC (Time-to-Digital Converter), thereby enabling real-time measurement and data transmission with limited energy.

CITATION LIST

Patent Literature

NPL 1

S. Takahashi, et al., "Real-Time Current-Waveform Sensor with Plugless Energy Harvesting from AC Power Lines for Home/Building Energy-Management Systems," 2011 IEEE International Solid-State Circuits Symposium, Technical Digest, pp. 220-221, February 2011.

SUMMARY OF INVENTION

Technical Problem

However, according to the sensor disclosed in NPL 1, the periods for performing measurement operation and transmission operation are limited in order to achieve low power consumption, and therefore there is a limitation on data length that can be transmitted at a time by the sensor. If the data length of a packet is short, the length of sensor identification information is also limited after a measurement data part is excluded, and the number of identifiable sensors is reduced. For example, when sensors measure and transmit current waveform information on individuals of an electric equipment group including a television, an air conditioner, a personal computer, and the like at home, it is necessary to transmit not only sensor identification information for identifying each sensor at home but also information for identifying an electric equipment to which the sensor is attached. Accordingly, in a situation where the data length of a packet is limited, it is impossible to identify a sufficient number of electric equipments, and it is impossible to accomplish effective energy management.

Accordingly, an object of the present invention is to provide a sensor system in which it is possible to identify a sufficient number of sensors even in a situation where the data length of a packet is limited, as well as a sensor and a receiving device in the system.

Solution to Problem

A sensor according to the present invention is a sensor that repeats a measurement period for performing measurement and a transmission period for performing transmission at predetermined cycles, characterized by comprising: measurement means that outputs during the measurement period measurement information based on predetermined measurement; and transmission means that transmits during the transmission period, by using a single packet or a plurality of packets, source identification information for identifying a source of a packet, the measurement information, and sensor-related information for identifying the sensor and/or a measurement target equipment of the sensor.

A receiving device according to the present invention is a receiving device that receives a packet from a sensor that repeats a measurement period for performing measurement and a transmission period for performing transmission at predetermined cycles, characterized by comprising: reception means that receives from the sensor a single packet or a plurality of packets including source identification information for identifying a source of the packet, measurement information measured by the sensor, and sensor-related information for identifying the sensor and/or a measurement target equipment of the sensor; and identification means that identifies the sensor and/or the measurement target equipment of the sensor based on the source identification information and the sensor-related information received from the sensor.

A sensor system according to the present invention is a sensor system including: a plurality of sensors that are provided to a plurality of electric equipments respectively and perform predetermined measurement; and a receiving device that receives a packet from each sensor, characterized in that each sensor repeats a measurement period for performing measurement and a transmission period for performing transmission at predetermined cycles, and transmits during the transmission period, by using a single packet or a plurality of packets, source identification information for identifying a source of a packet, a measurement result of the measurement, and sensor-related information for identifying the sensor and/or a measurement target equipment of this sensor, and the receiving device receives from the sensors the single packet or the plurality of packets including the source identification information, the measurement result, and the sensor-related information for identifying the sensors and/or the respective electric equipments of the sensors, and identifies the sensors and/or the respective electric equipments of the sensors based on the source identification information and the sensor-related information received.

Advantageous Effects of Invention

According to the present invention, it is possible to identify a sufficient number of sensors even in a situation where the data length of a packet is limited.

DESCRIPTION OF EMBODIMENTS

According to an exemplary embodiment of the present invention, a sensor that repeats a measurement period for performing measurement and a transmission period for performing transmission at predetermined cycles transmits source identification information, measurement information, and sensor-related information during the transmission period by using a single packet or a plurality of packets, whereby it is possible to identify a sufficient number of sensors or sensor-target equipments even in a situation where the data length of a packet is limited. Hereinafter, the exemplary embodiment and examples of the present invention will be described in detail.

Figure 1:
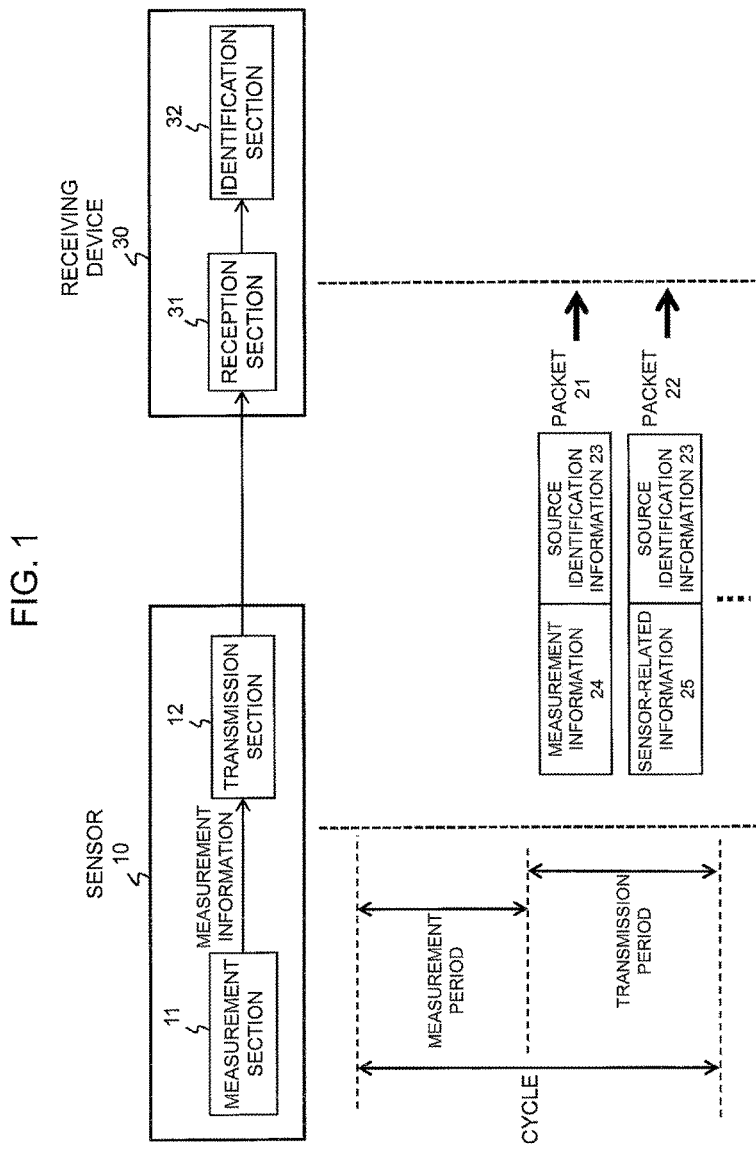
FIG. 1 is a schematic block diagram for describing configurations and operations of a sensor and a receiving device according to an exemplary embodiment of the present invention.

Referring to FIG. 1, a sensor 10 according to the present exemplary embodiment includes a measurement section 11 and a transmission section 12 and performs packet communication with a receiving device 30. The sensor 10 repeats a measurement period for performing measurement and a transmission period for performing transmission at predetermined cycles. That is, during the measurement period, the measurement section 11 generates measurement information based on predetermined measurement and outputs it to the transmission section 12. The transmission section 12, during the transmission period, transmits source identification information 23 for identifying the source of a packet, the measurement information 24, and sensor-related information 25 for identifying the sensor and/or its measurement target by using a single packet or a plurality of packets. Preferably, a packet 21 including the source identification information 23 and the measurement information 24 and a packet 22 including the source identification information 23 and the sensor-related information 25 are transmitted separately, whereby it is possible to identify more sensors and/or measurement targets.

Moreover, the receiving device 30 according to the present exemplary embodiment includes a reception section 31 and an identification section 32, wherein the reception section 31 receives the packets 21 and 22 from the sensor 10, and the identification section 32 identifies the sensor 10 and/or its measurement target based on the source identification information 23 and the sensor-related information 25 received.

According to the sensor 10 and the receiving device 30, since the sensor-related information 25, apart from the source identification information 23 and the measurement information 24, is included in a packet transmitted during the transmission period, it is possible to identify more sensors in more detail while achieving the power saving of the sensor.

Note that for a method for dividing information to transmit into packets and transmitting them, technologies typified by TCP/IP used for the Internet are known. However, to achieve super low power operation, some sensors cannot receive control signals and the like. Accordingly, there are such restrictions that a sensor cannot receive a code for acknowledgement of data reception and that a management system cannot request a retransmission from the sensor, and therefore it is difficult to use such technologies as TCP/IP. In the present exemplary embodiment, the sensor has no reception function, thereby achieving power saving, and it is assumed that packets are transmitted uni-directionally from the sensor to the receiving device.

1. Sensor System

Figure 2:
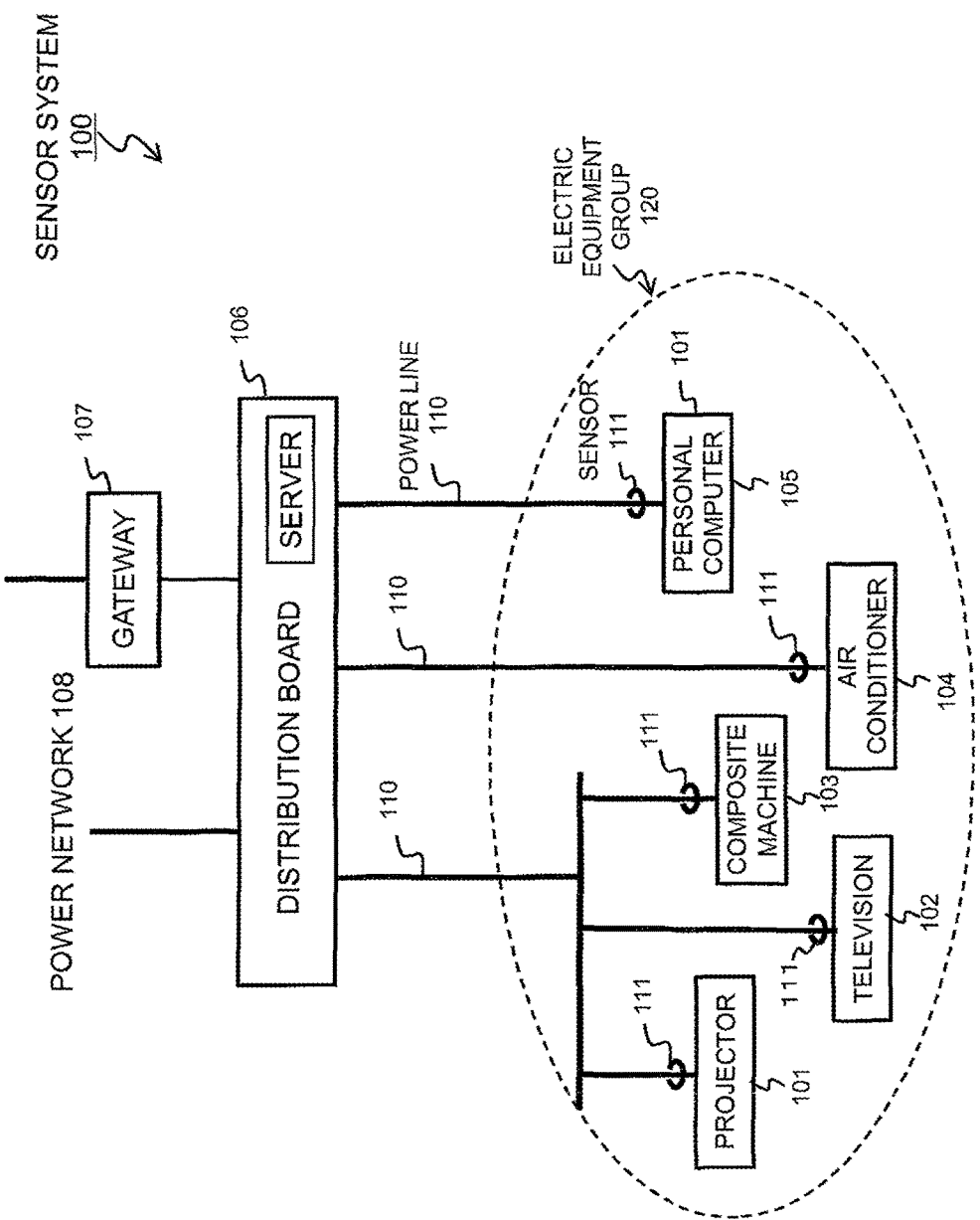
FIG. 2 is a schematic diagram showing an example of a sensor system to which the present exemplary embodiment is applied.

Referring to FIG. 2, a sensor system 100 according to the present exemplary embodiment constitutes, for example, a home energy management system, wherein a sensor 111 is attached to the inside of each of electric equipments 101 to 105 or a receptacle section at home, and sensor information is sent from each sensor 111 to a receiving device (server) installed in a distribution board 106 and can be transmitted to an external network via the server. Note that the receiving device (server) may be installed outside the distribution board 106, and the place where it is installed is not limited. Note that communication between a sensor 111 and the receiving device is not limited to communication means through the power line 110.

Here, it is assumed that a projector 101, a television 102, a composite machine 103, an air conditioner 104, and a personal computer 105 are included in an electric equipment group 120 at home and that the sensor 111 is provided at the inside of each equipment or the receptacle section. Each sensor 111 is connected through the power line 110, in a communicable manner, to the distribution board 106 where the receiving device is installed, and the distribution board 106 is further connected to a power network 108 while the receiving device (server) is also connected to the Internet 109 via a gateway 107.

A network at home, which is a network including the electric equipment group, is an internal network, and networks outside the home, which are the power network 108 and the Internet 109, are external networks. In the networks, an equipment is identified based on identification information, and a local ID, which will be described later, is identification information for identifying an equipment mainly in the internal network.

This sensor system 100 is a system in which sensor nodes are deployed at various places and information obtained therefrom is collected. For example, current sensors are attached to electric equipments, receptacles, and a distribution board, and their information is collected at a management system, so that it is visualized how power is consumed, whereby energy saving can be achieved by advising a user about the efficient use of power and by controlling the operations of the individual electric equipments.

Next, a more detailed description will be given of configurations and operations of the sensor and the receiving device according to the present exemplary embodiment by using FIG. 3. Here, it is assumed that a sensor 200 is provided to an electric equipment in FIG. 2, and a receiving device 300 is provided to the distribution board 106.

Figure 3:
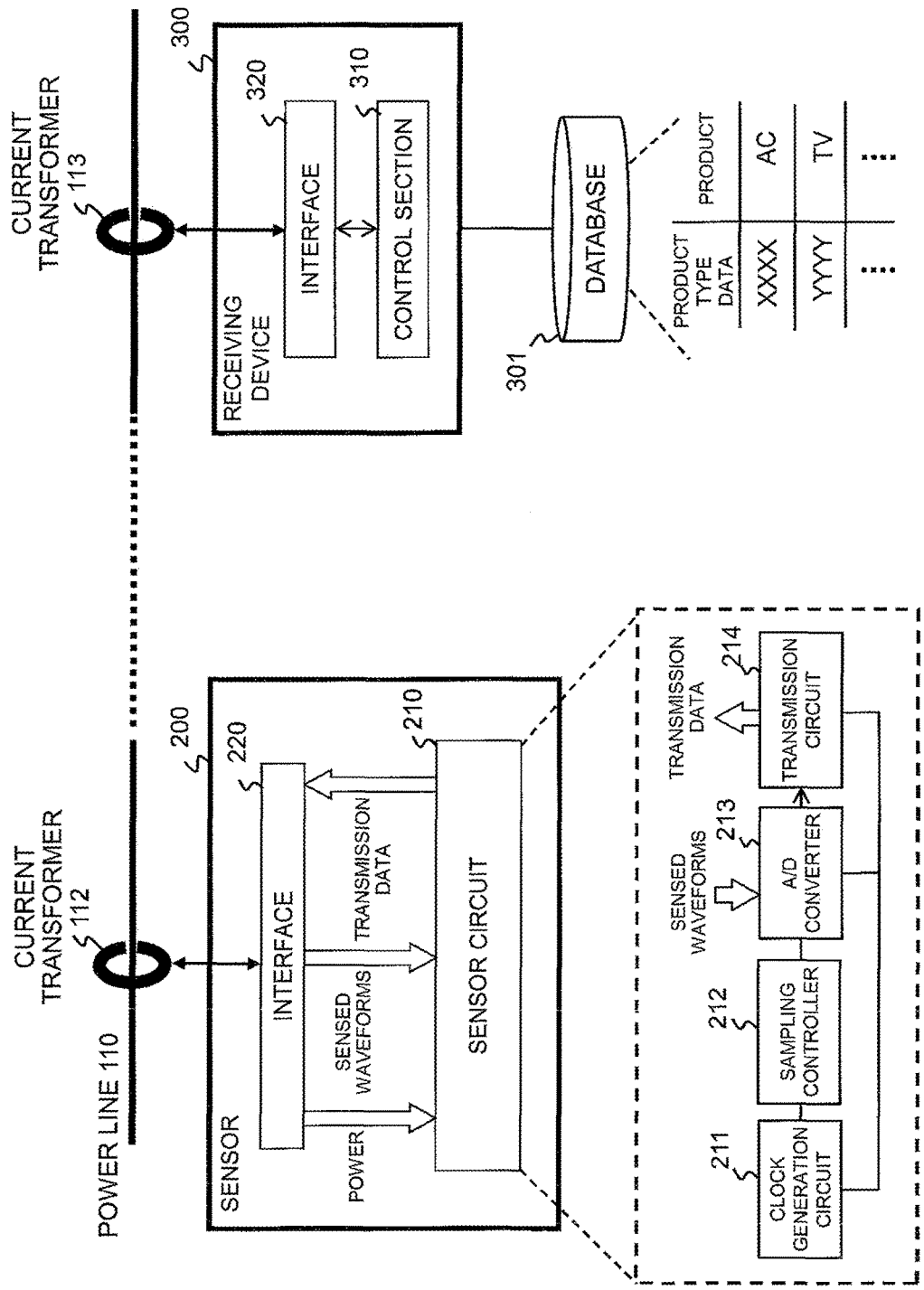
FIG. 3 is a block diagram showing a more detailed configuration of the sensor system shown in FIG. 2.

Referring to FIG. 3, the sensor 200 is connected to a current transformer 112, and this current transformer 112 is attached to a power line 110. On the other hand, the receiving device 300 is connected to another current transformer 113, and the current transformer 113 is similarly attached to the power line 110. The sensor 200 and the receiving device 300 send and receive sensor information through the power line 110 by using the current transformers 112 and 113.

In general, a current transformer is formed of a coil wound around a core material and is attached in such a manner as to surround a single AC power line. Accordingly, current flows through the coil in accordance with changes in a magnetic field generated from AC current flowing through the AC power line, and can be monitored as current waveforms of the AC power line.

The sensor 200 samples current waveforms detected by the current transformer 112, which will be described later, and also uses them for sensor power supply. Accordingly, the sensor 200 requires no battery as a power supply and, once it is installed, can operate without maintenance. Moreover, the sampling data of the detected current waveforms is superimposed on the AC current of the power line 110 via the current transformer 112 through OOK (On-Off Keying) modulation. In this manner, the sensor 200 samples and detects the current flowing along the AC power line, whereby the sensor 200 can transmit detected waveform data as measurement data through the power line 110 while securing power supply, and is suitable for miniaturization with a simple structure of parts and no battery.

Specifically, the sensor 200 has a sensor circuit 210 and an interface 220. The interface 220 receives signal inputs from and makes signal outputs to the current transformer 112, supplying generated power and detected current waveforms to the sensor circuit 210, and outputting transmission data packets generated by the sensor circuit 210 to the current transformer 112.

The sensor circuit 210 includes a clock generation circuit 211, a sampling controller 212, an A/D convertor 213, and a transmission circuit 214 and operates with the power supplied from the current transformer 112. Here, the sampling controller 212 and the ND converter 213 correspond to the measurement section 11 in FIG. 1, while the transmission circuit 214 corresponds to the transmission section 12 in FIG. 1.

The clock generation circuit 211 generates a clock signal of a predetermined frequency and supplies it to each circuit, and each circuit operates with timing based on this clock signal.

The sampling controller 212 controls timing for sampling and the like, and the ND converter 213, in accordance with control by the sampling controller 212, converts the analog values of detected current waveforms into digital values and outputs sampling data (measurement data) to the transmission circuit 214. The transmission circuit 214 generates a packet including the sampling data or a packet including sensor-related information and outputs it as transmission data to the interface 220. The interface 220 drives the current transformer 112 in accordance with the input transmission data and superimposes the transmission data on the power line 110.

Note that a memory circuit (not shown) is provided to the transmission circuit 214 and stores the sensor-related information to be included in a packet, such as, for example, a local ID for identifying the sensor and product type data on the sensor-target equipment, or a unique ID or an extended ID for identifying the target equipment. The transmission circuit 214 generates packets from such required information and sampling data and transmits them.

On the other hand, the receiving device 300 has an interface 320 and a control section 310. Here, the interface 320 corresponds to the reception section 31 in FIG. 1, while the control section 310 corresponds to the identification section 32.

The interface 320 receives signal inputs from and makes signal outputs to the current transformer 113, and extracts at the current transformer 113 data superimposed on the power line 110 by the sensor 200, demodulates it, and outputs it as a packet to the control section 310.

The control section 310 analyzes the input packet, obtains sensor-related information (a local ID, product type data, and the like) or sampling data included in the packet, and performs data processing for product identification, power management, or the like while referring to a database 301. The database 301 is connected to the receiving device 300 and stores, for example, product type data and detailed information such as product types, which are associated with each other. The control section 310, based on received product type data, refers to the database 301 and obtains detailed information on a sensor-target equipment corresponding to the product type data. That is, based on the product type data, it is identified that a sensor of interest is a sensor for the air conditioner or television. Accordingly, the sensors 200 measure and transmit current waveforms of the electric equipments, and the receiving device 300 analyzes measurement data on the current waveforms received from each sensor, whereby it is possible to estimate the power consumption of the electric equipments at home.

Note that the database 301 may be connected through an external network or may be provided inside the receiving device 300.

2. Operation of Sensor

Next, a sampling operation and a transmission operation of the sensor 200 will be described by using FIGS. 4 to 7.

Figure 4:
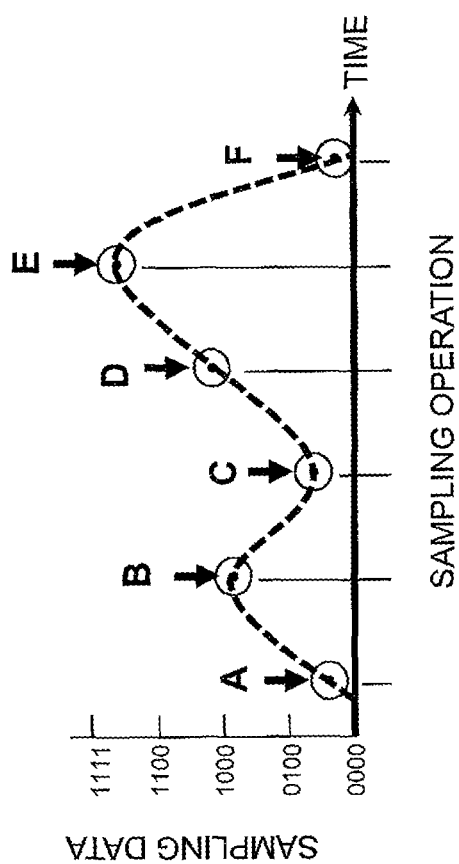
FIG. 4 is a current waveform diagram for describing a sampling operation of the sensor according to the present exemplary embodiment.
Figure 5:
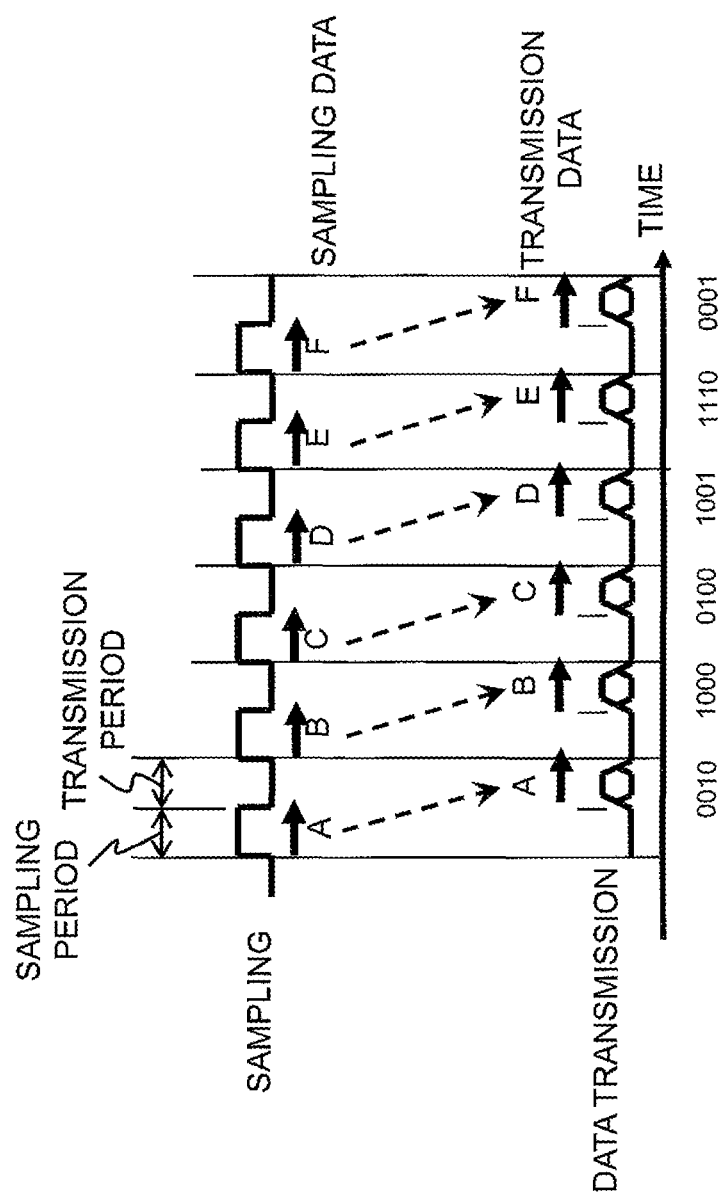
FIG. 5 is a time chart showing the sampling operation and a transmission operation of the sensor according to the present exemplary embodiment.
Figure 6:
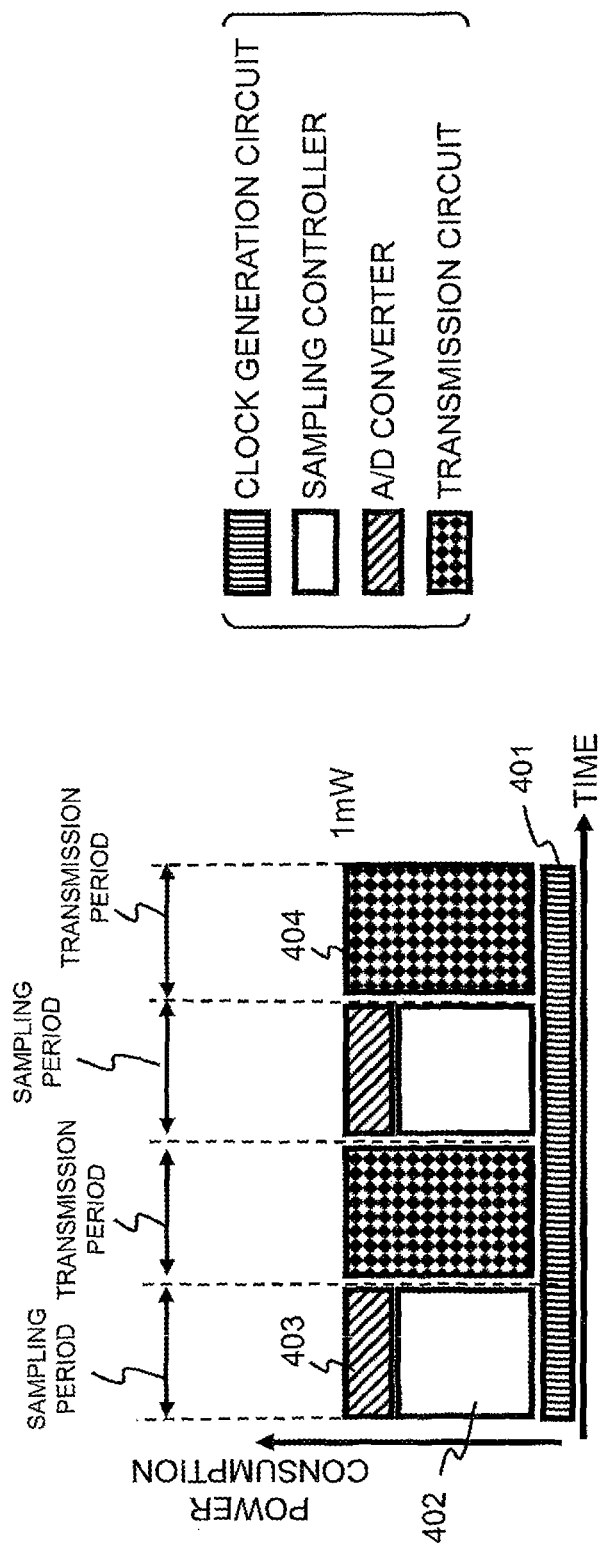
FIG. 6 is a schematic diagram showing changes in a breakdown of power consumption of the sensor according to the present exemplary embodiment.
Figure 7:
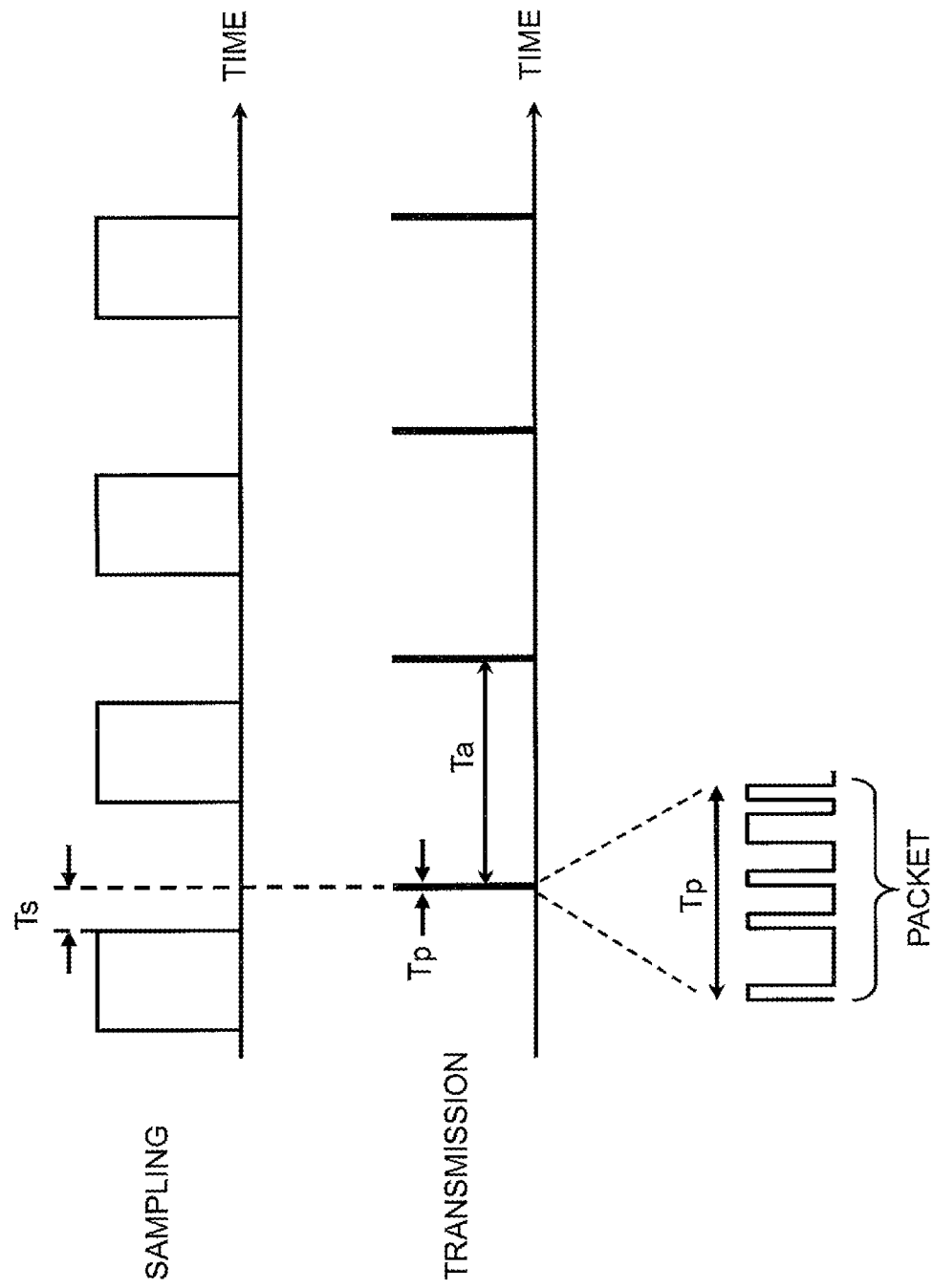
FIG. 7 is a time chart showing sampling timing and transmission timing of the sensor according to the present exemplary embodiment.

FIGS. 4 and 5 show timings for the sampling operation and the transmission operation, FIG. 6 shows power consumption due to the sampling operation and the transmission operation, and FIG. 7 shows sampling intervals (cycles) and transmission intervals.

Referring to FIG. 4, detected current waveforms are sampled by the sampling controller 212 and the ND converter 213 at predetermined sampling intervals, whereby sampling data is generated. Here, it is assumed that six sampling data, data A to F, are generated sequentially.

At the sensor 200, a sampling period for performing sampling and a transmission period for performing data transmission are alternately repeated at predetermined cycles. The sampling period is a measurement period during which the sensor performs measurement. For example, the A/D converter 213 generates the sampling data A during the first sampling period and outputs it to the transmission circuit 214, and then the transmission circuit 214 transmits the data A during the subsequent transmission period. Thereafter, sampling and transmission of the data B to F are sequentially performed in a similar manner. In FIG. 5, it is assumed that packets including "0010," "1000," "0100," "1001," "1110," and "0001" as the sampling data A to F respectively, are sequentially transmitted.

As described earlier, since the sensor 200 samples waveforms of the current flowing along the power line, packetizes obtained sampling data as it is without writing it into a memory, and transmits it through the AC power line, it is possible to reduce the power consumption required for writing into the memory. Although the sensor 200 covers the power supply required for operation by utilizing energy harvesting from the AC power line, obtainable power is several milli-watts or smaller. In the present exemplary embodiment, sampling and data transmission are alternately performed, whereby a reduction in power consumption is achieved, and required power supply is secured within limited power, which will be described next.

Referring to FIG. 6, the sensor 200 repeats the sampling period and the transmission period, thereby suppressing power consumption to a certain level. A breakdown of the power consumption of the sensor 200 includes power consumption 401 by the clock generation circuit 211, power consumption 402 by the sampling controller 212, power consumption 403 by the ND converter 213, and power consumption 404 by the transmission circuit 214. That is, although the power 401 for the clock is always consumed, only the power consumptions 402 and 403 by the sampling controller and the ND converter are added during sampling, while only the power consumption 404 by the transmission circuit is added during data transmission. Therefore, it is possible to perform sampling and transmission always with a power consumption of approximately 1 mW.

Moreover, referring to FIG. 7, the sensor 200 intermittently transmits a packet including the local ID and sampling data each time sampling is performed. Here, a packet is transmitted within a period Tp starting after Ts has passed since the completion of sampling, and packet transmission is repeated at cycles (intervals) Ta. Intermittent transmission can reduce the probability that a plurality of data transmitted from sensors will collide with each other when a plurality of sensors are attached to the same power line.

3. Packet Length and the Number of IDs

Next, a consideration will be given of the packet length transmitted by the sensor 200. The packet length depends on the amount of data to be transmitted and the transmission rate. At the sensor 200, it is necessary to consider operation timings as in FIGS. 4 to 7.

For example, in a case of sampling fine current waveforms, the required sampling rate is about 2 kHz, and if alternate sampling and data transmission are attempted, the interval Ta enabling transmission is 500 microseconds or shorter. In addition, if a plurality of equipments are connected to the AC power line 110, since it is necessary to suppress the possibility that data transmission performed by the sensors mounted in the respective equipments coincide, transmission should be performed within a period not longer than a few percent. Supposing that the period Tp for a single sensor to make an output is 10 microseconds, the amount of information that can be transmitted at a time is 30 bits when a transmission is made at a data rate of 3 Mbps, and it is the length of a packet.

Incidentally, if the data rate is increased, it is possible to transmit more information. However, the carrier frequency for transmitting data needs to be, for example, about 10 times as high as the transmission rate, but the carrier frequency must be suppressed to about 30 MHz or lower from the viewpoints of the Guidelines on Protection from Electromagnetic Fields and transmission loss. Therefore, there is a limit to an increase in the transmission rate.

Next, a consideration will be given of an ID for identifying a sensor or a sensor-target equipment. Here, a packet is set to be 30 bits as described above. If current waveform information is represented by, for example, 12 bits, the remaining 18 bits can be assigned for an ID, so that about 260 thousands sensors or electric equipments can be identified. Note that this number of IDs is sufficient for use at, for example, a single home, but since equipments used in the whole world are in 100 millions of units, there may be shortages if unique IDs are assigned.

Accordingly, the sensor 200 transmits source identification information, measurement information, and sensor-related information by using a single packet or a plurality of packets during a transmission period, whereby it is possible to transmit the sensor-related information with a required length to the receiving device 300, and it is possible to identify a sufficient number of sensors or sensor-target equipments even in a situation where the data length of a packet is limited. Hereinafter, as examples of the present invention, a description will be given of examples of a packet structure for identifying a sufficient number of sensors or electric equipments when there is a limit to the number of bits of a packet.

4. EXAMPLES 4.1) First Example

According to a first example of the present invention, a local ID as source identification information, sampling data as measurement information, and product type data as sensor-related information are transmitted by using a single packet with a predetermined format.

Figure 8:
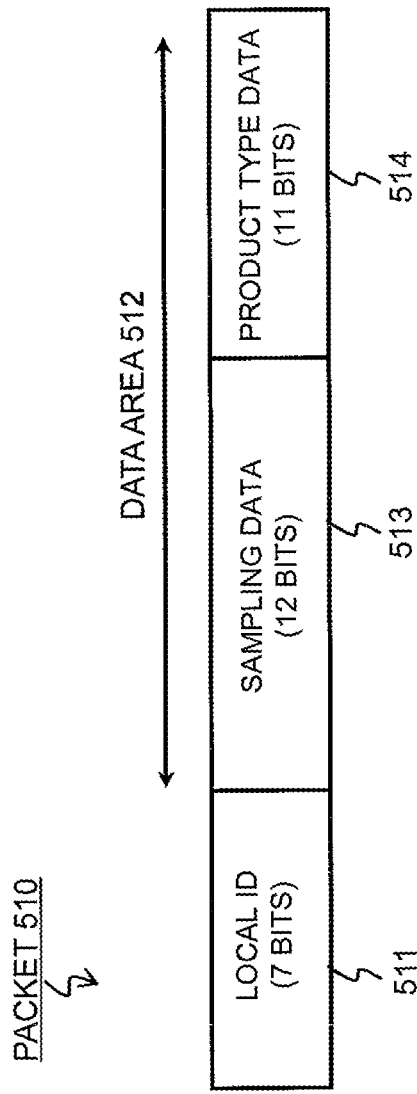
FIG. 8 is a format diagram of a packet to be transmitted by a sensor according to a first example of the present invention.

Referring to FIG. 8, a packet 510 includes a local ID 511 and a data area 512, and the data area 512 includes sampling data 513 and product type data 514. In the present example, it is assumed that the packet length of a whole packet is 30 bits, of which 7 bits are for the local ID 511, 12 bits are for the sampling data 513, and 11 bits are for the product type data 514. The local ID 511 is identification information for identifying the source of a packet and is identification information identifiable particularly in a local network. The sampling data 513 is a measurement result sampled at sampling intervals.

The product type data 514 is information related to a sensor and is information for identifying the type of a sensor or a sensor-target equipment. Since the product type data 514 of 11 bits can represent 2,048 types, it is possible to sufficiently cover the product types of sensors or electric equipments. Moreover, more detailed identification is also possible with a total of 18 bits of the local ID and the product type data.

Referring to the sensor circuit 210 shown in FIG. 3, the transmission circuit 214, when receiving an input of sampling data from the ND converter 213, generates the packet 510 in which the local ID, the sampling data, and the product type data are stored in the data area 512 as shown in FIG. 8, and transmits it to the power line 110 via the interface 220.

The control section 310 of the receiving device 300, when receiving the packet 510 from the power line 110 via the interface 320, obtains the local ID, the sampling data, and the product type data from the received packet 510 in accordance with the predetermined format shown in FIG. 8. The control section 310, based on the local ID, identifies which sensor (a sensor installed in which place) the sampling data comes from and, referring to the database 301 by using the product type data, identifies the type of the sensor or the sensor-target equipment. In this manner, it is possible to identify which sensor installed in which product transmits what sampling data, which can be used for energy management.

As described above, according to the first example of the present invention, by using the local ID consisting of a relatively small number of bits, it is possible to discriminate between sensors handled by the receiving device 300, and further by searching the database 301 using the product type data, which is sensor-related information, it is possible to make association with more detailed information. Thus, the sampling data is not mere measurement data, but can be identified as the data on which product installed in which place, making finer energy management possible. For example, if it is known that the sampling data is of the current consumed by an air conditioner and it is known by using another temperature sensor that the air conditioner makes an unnecessary environment temperature, then it is possible to advise a user to power off the air conditioner. Further, if an equipment incorporating a sensor is bought, it is possible to save the work of system installation because the receiving device 300 can discriminate between product types even if a user makes no settings.

4.2) Second Example

According to a second example of the present invention, a local ID as source identification information, sampling data as measurement information, and an extended ID as sensor-related information are transmitted by using two packets in which packet's data types are changed.

Figure 9:
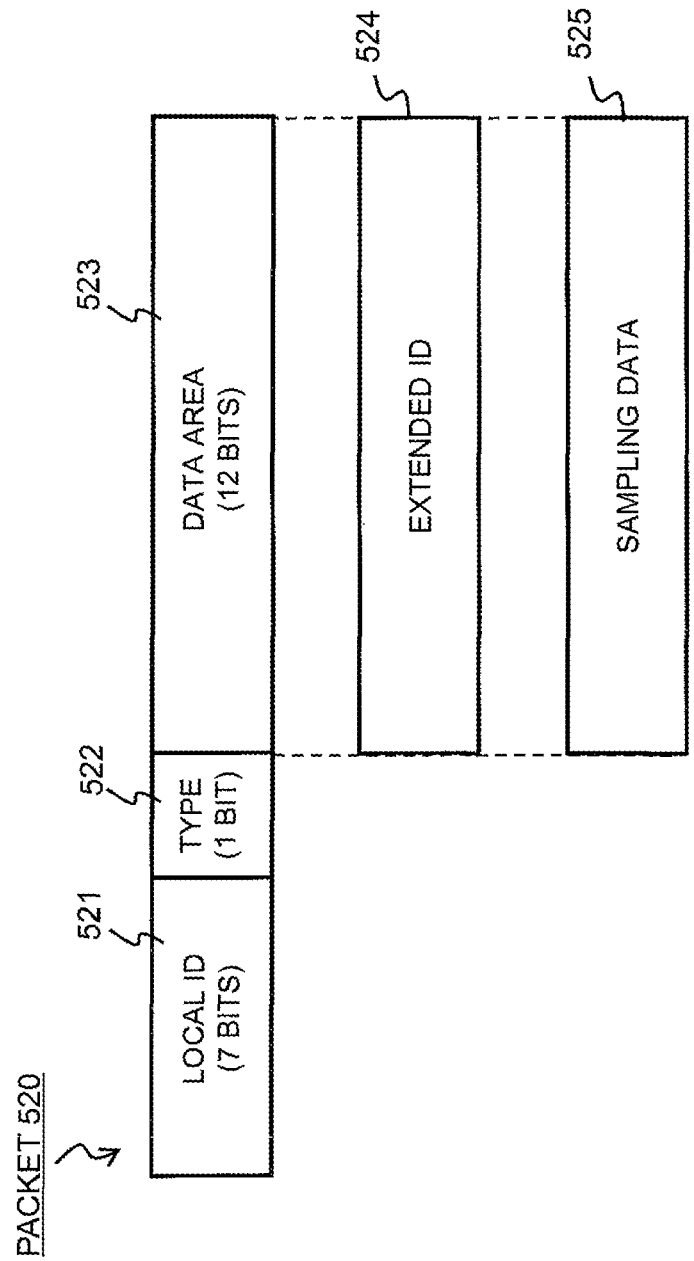
FIG. 9 is a format diagram of a packet to be transmitted by a sensor according to a second example of the present invention.

Referring to FIG. 9, a packet 520 includes a local ID 521, a type flag 522, and a data area 523. The data area 523 can include either an extended ID 524 or sampling data 525. The packet 520 according to the present example is a total of 20 bits, of which 7 bits are for the local ID 521, 1 bit is for the type flag 522, and 12 bits are for the data area 523. The type flag 522 takes on "0" or "1," thereby showing which one of the extended ID 524 and the sampling data 525 the subsequent data area 523 includes.

The extended ID 524 is an ID for identifying a sensor, extending the local ID to enable more sensors to be identified.

Referring to the sensor circuit 210 shown in FIG. 3, the transmission circuit 214 generates the packet 520 including the local ID 521 and the data area 523, which includes either the sampling data 525 or the extended ID 524, and transmits it to the power line 110 via the interface 220. For example, a packet including the extended ID 524 is transmitted when the sensor starts operation or when no sampling data is generated, or alternatively at periodic timing. At other times, a packet including the sampling data 525 is transmitted.

The control section 310 of the receiving device 300, when receiving the packet 520 from the power line 110 via the interface 320, analyzes the local ID 521 and the type flag 522 in the packet and obtains the local ID 521 and either the sampling data 525 or the extended ID 524 from the received packet. When the extended ID 524 is included, the control section 310 stores the local ID 521 and the extended ID 524 which are associated with each other. When the sampling data is included, the control section 310 retrieves the stored extend ID associated with the local ID 521 and identifies the type of the sensor based on the extended ID.

As described above, according to the second example of the present invention, even if the receiving device 300 receives packets from a plurality of sensors, it is possible to identify which sensor a packet comes from based on the local ID. Further, when the local ID 521 and the extended ID 524 are received in a single packet at some timing, a combination of the local ID and the extended ID that the source sensor of interest has can be obtained. Therefore, the extended ID can be specified only with the local ID thereafter, so that it is possible to represent a larger number of sensors. It is possible to search for more detailed information stored in the database 301 by checking such IDs with the database 301.

4.3) Third Example

According to a third example of the present invention, a local ID as source identification information, sampling data as measurement information, and a unique ID as sensor-related information are transmitted by using two packets in which packet's data types are changed.

Figure 10:
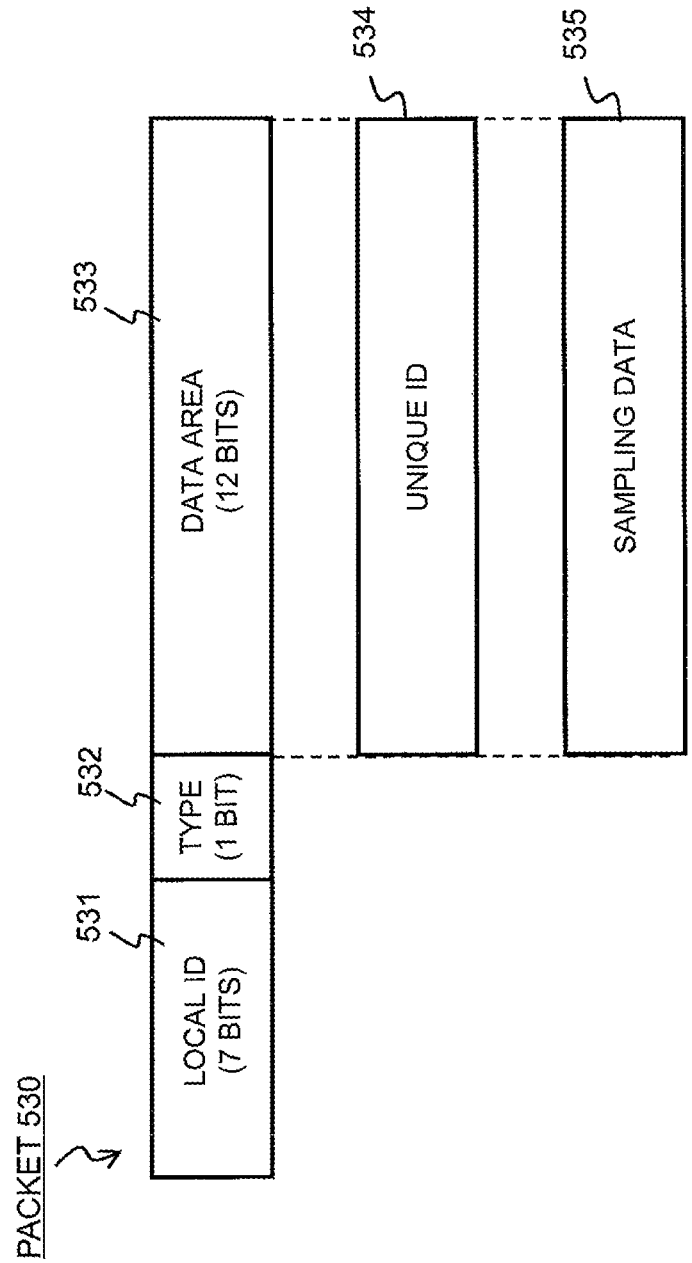
FIG. 10 is a format diagram of a packet to be transmitted by a sensor according to a third example of the present invention.

Referring to FIG. 10, a packet 530 includes a local ID 531, a type flag 532, and a data area 533, and the data area 533 includes either a unique ID 534 or sampling data 535. Compared with the second example shown in FIG. 9, a difference is the unique ID in place of the extend ID, and the other components and the bit length are similar.

The unique ID is an ID for identifying a sensor or a sensor-target equipment and has a longer length than a local ID, preferably, has as large a number of bits as can accommodate one ID in terms of practical use. That is, it is assumed here that the unique ID is 12 bits, but it suffices if the unique ID is larger than the local ID of 7 bits. For example, if the packet length is 30 bits, the unique ID may be 22 bits.

According to the third example of the present invention, effects similar to the second example can be obtained. That is, it is possible to identify which sensor a packet comes from based on the local ID. Further, by combining the local ID and the unique ID, it is possible to refer to the unique ID only with the local ID, so that it is possible to represent a larger number. Moreover, by checking such IDs with the database, it is possible to make association with more detailed information.

4.4) Fourth Example

According to a fourth example of the present invention, a local ID as source identification information, sampling data as measurement information, and partial information on a unique ID as sensor-related information are transmitted by using two or more packets in which packet's data types are changed. In the present example, a unique ID is divided into parts, which are transmitted along with their location information by using a plurality of packets, and a receiving side reconfigures the whole unique ID in accordance with the location information, whereby it is possible to transmit the unique ID of a large number of bits.

Figure 11:
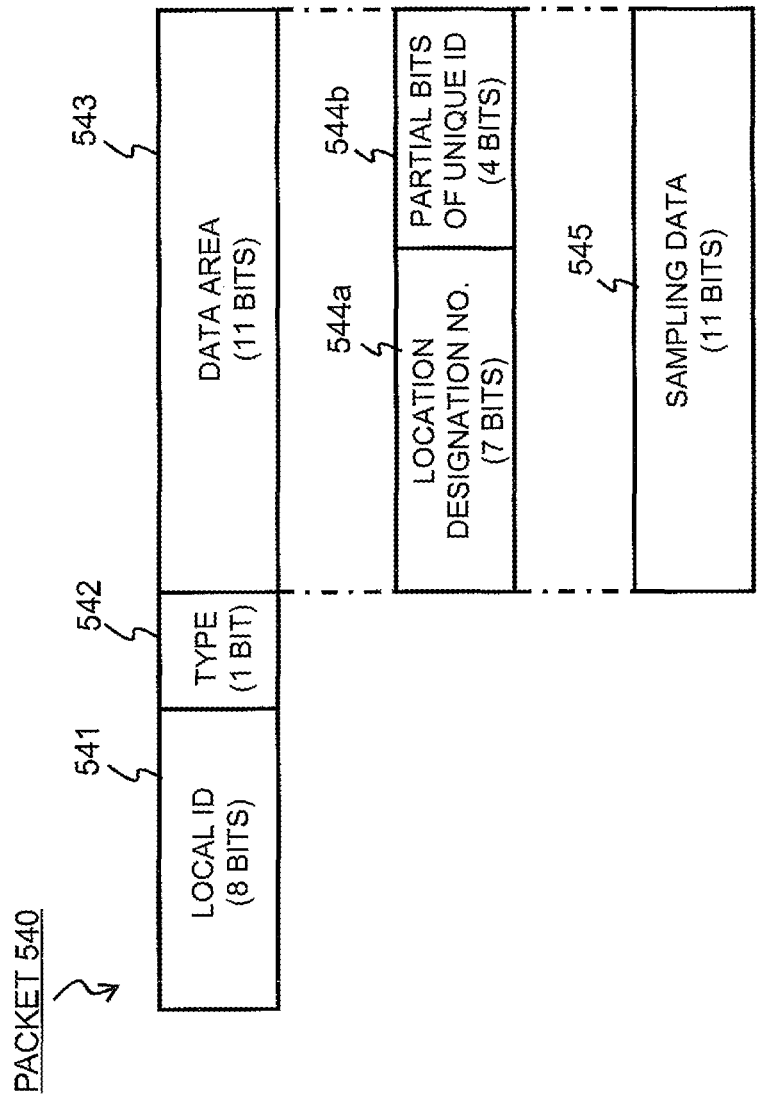
FIG. 11 is a format diagram of a packet to be transmitted by a sensor according to a fourth example of the present invention.

Referring to FIG. 11, a packet 540 includes a local ID 541, a type flag 542, and a data area 543, and the data area 543 can include either a combination of partial bits 544b, which are a part of a unique ID, and its location designation number 544a, or sampling data 545. The packet 540 is a total of 20 bits, of which, for example, 8 bits are for the local ID 541, 1 bit is for the type flag 542, and 11 bits are for the data area 543.

The type flag 542 takes on "0" or "1," thereby showing which one of the partial bits 544b of the unique ID and the sampling data 545 the subsequent data area includes.

When the data area 543 includes partial bits of the unique ID, this area consists of 7 bits for the location designation number 544a and 4 bits for the partial bits 544b of the body of the unique ID. In a case where a unique ID has a long bit length and cannot be accommodated in a single packet, the unique ID is divided for transmission. For example, assuming that a whole unique ID is 128 bits, 4 bits starting from an i-th bit location in the unique ID, which is designated by a location designation number (i), are included in the packet 540 as partial bits of the unique ID.

Referring to the sensor circuit 210 shown in FIG. 3, the transmission circuit 214 generates the packet 540 including the local ID and either sampling data or partial bits of the unique ID as shown in FIG. 11 and transmits it to the power line 110 via the interface 220. For example, a packet including partial bits of the unique ID is transmitted when the sensor starts operation or when no sampling data is generated, or alternatively at periodic timing. At other times, a packet including sampling data is transmitted. For example, the transmission circuit 214 obtains from the whole unique ID 4 partial bits starting from a random location that is obtained based on a random number or the like, and generates a packet including the partial bits of the unique ID.

When receiving such a packet 540, the control section 310 of the receiving device 300 obtains the local ID and either sampling data or partial bits of the unique ID from the received packet. When partial bits of the unique ID are included, the control section 310 stores the partial bits at a bit location designated by the location designation number 544a and similarly stores partial bits of the unique ID from other received packets, thereby configuring the whole unique ID. When all the bits of the unique ID are obtained, the local ID and the unique ID are associated with each other, and when sampling data is received, the unique ID stored in association with the local ID is obtained, whereby the type of the sensor or the sensor-target equipment is identified based on the unique ID.

Figure 12:
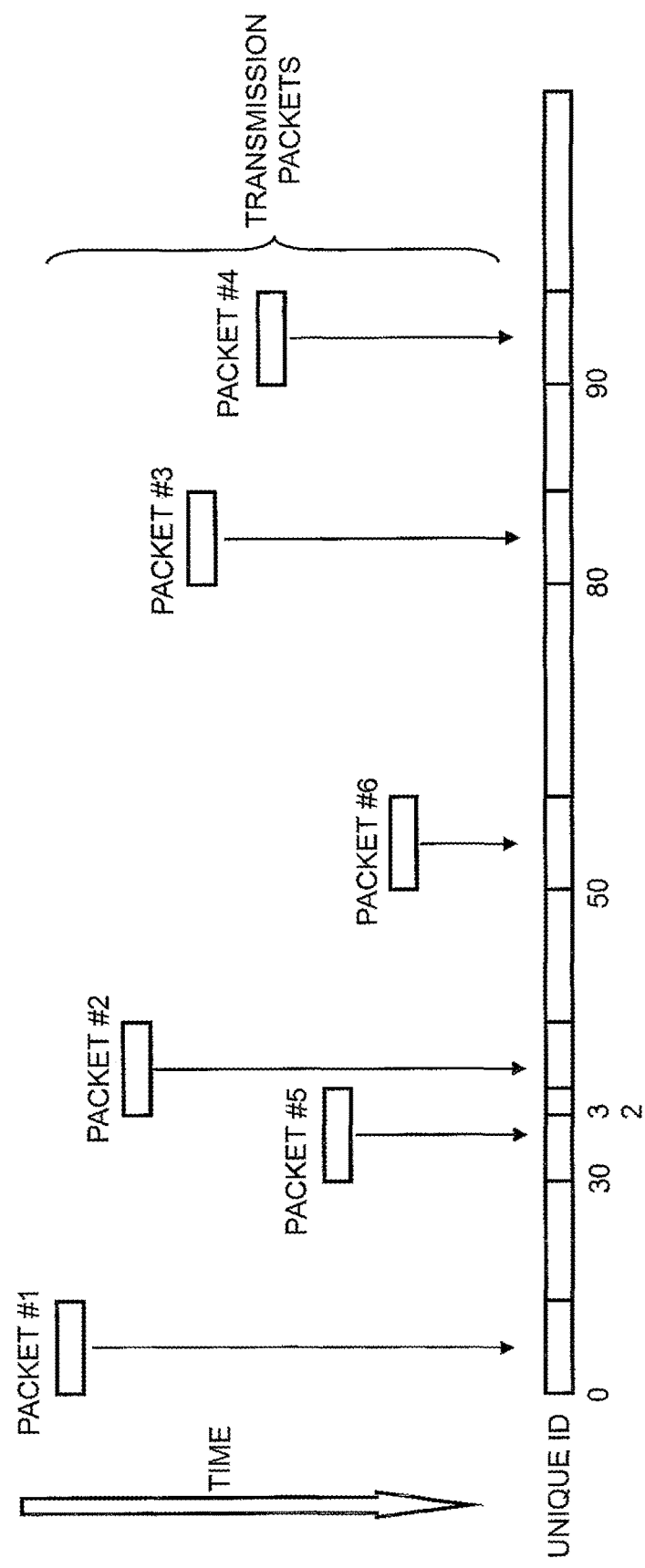
FIG. 12 is a schematic diagram showing an example of a unique ID that the receiving device reconfigures by using the packets transmitted by the sensor according to the fourth example.

Referring to FIG. 12, the control section 310 of the receiving device 300, when receiving a packet from the sensor 200, reconfigures the unique ID in accordance with the location designation number 544a. In the drawing, what are referred to as transmission packets are parts (4 bits) of the body of the unique ID. That is, shown is a case where 4 partial bits of the unique ID starting from an i-th bit (1≤i<125) randomly chosen from the whole unique ID are received, and the whole unique ID is reconfigured.

For example, when 4 bits starting from the 0th bit of the unique ID are transmitted by using a packet #1, and subsequently, in a similar manner, 4 bits starting from the 32nd bit, 4 bits starting from the 80th bit, 4 bits starting from the 90th bit, 4 bits starting from the 30th bit, and 4 bits starting from the 50th bit are transmitted by using the packets #2, #3, #4, #5, and #6, respectively, then at the receiving device, reconfiguration is performed in such a manner that the partial bits are stored at their corresponding bit locations in the unique ID 4 bits by 4 bits.

As described above, according to the fourth example of the present invention, a packet including partial bits of the unique ID is transmitted multiple times, whereby the receiving device reconfigures the whole unique ID, and when a sufficient number of packets are received, the complete unique ID is reconfigured in the end. As a result, since a combination of the local ID and the unique ID that the sensor has can be obtained, it is possible to refer to the unique ID only with the local ID thereafter, so that it is possible to represent a larger number. By checking such IDs with the database, it is possible to make association with further information, as in the other embodiments.

Since the sensor can sufficiently repeat transmission of a part of the unique ID, it is possible to pass the whole unique ID to the receiving device side by taking time, without the receiving side making a retransmission. Moreover, even if parts of the unique ID overlap, or even if packets from a plurality of sensors collide and are lost, the whole unique ID is reconfigured on the receiving device side in the end.

4.5) Fifth Example

According to a fifth example of the present invention, a local ID as source identification information, sampling data as measurement information, and partial information on a unique ID as sensor-related information are transmitted by using two or more packets in which packet's data types are changed. In the present example, a unique ID is divided into parts, which are sequentially transmitted by using a plurality of packets, and a receiving side arranges partial bits of the unique ID in the order they are received and thus reconfigures the whole unique ID, whereby it is possible to transmit the unique ID of a large number of bits.

Figure 13:
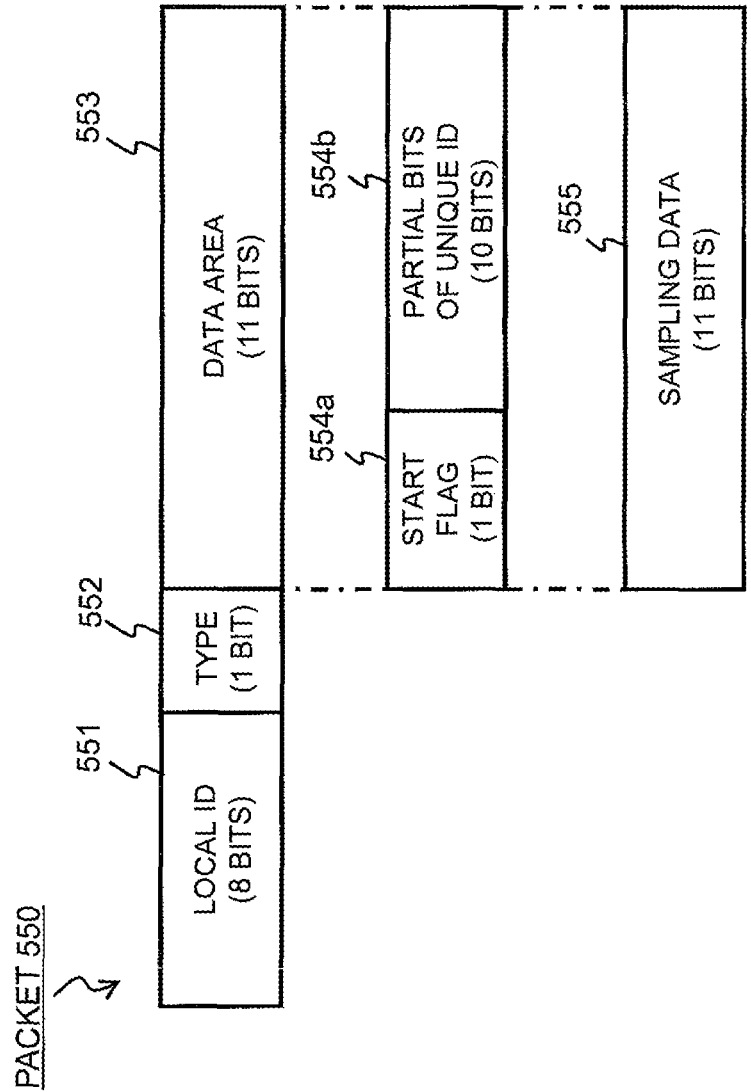
FIG. 13 is a format diagram of a packet to be transmitted by a sensor according to a fifth example of the present invention.

Referring to FIG. 13, a packet 550 includes a local ID 551, a type flag 552, and a data area 553, and the data area 553 includes either partial bits 554b, which are a part of a unique ID, or sampling data 555. Compared with the fourth example in FIG. 11, the location designation number is replaced by a start flag, and the other components and the bit length are similar to those in FIG. 11, except that the start flag is 1 bit, and the partial bits of the unique ID are 10 bits.

A start flag 554a is a flag indicating whether or not a transmission of partial bits of the unique ID is the first one and, for example, takes on "0" when the first 10 bits of the unique ID are transmitted, but takes on "1" when the remaining parts are sequentially transmitted.

Figure 14:
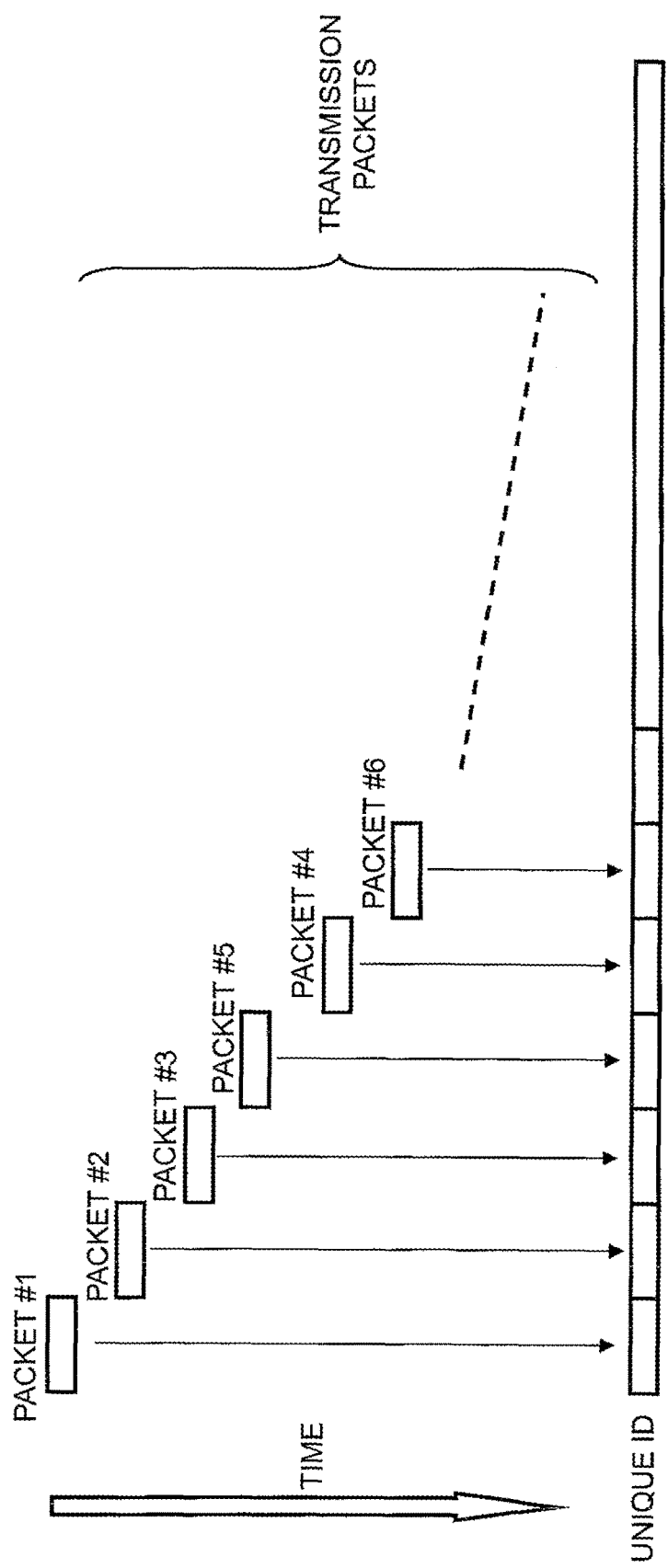
FIG. 14 is a schematic diagram showing an example of a unique ID that the receiving device reconfigures by using the packets transmitted by the sensor according to the fifth example.

FIG. 14 shows that the receiving device reconfigures the unique ID by receiving packets from the sensor. In the drawing, what are referred to as transmission packets are parts (10 bits) of the body of the unique ID.

For example, 10 bits starting from the 0th bit of the unique ID are transmitted by using a packet #1, and subsequently 10 bits starting from the 10th bit are transmitted by using a packet #2. Thereafter, in a similar manner, bits are sequentially transmitted 10 bits by 10 bits by using subsequent packets. At the receiving device, the unique ID is extracted from the received packet #1 in which the start flag is "0" and stored at the 0th bit, and thereafter, the unique ID is extracted from the other received packets in which the start flag is "1," whereby the unique ID is sequentially reconfigured.

As described above, according to the fifth example of the present invention, effects similar to the above-described fourth example can be obtained. That is, when the unique ID has been reconfigured with partial bits of the unique ID, it is possible to refer to the unique ID only with the local ID, so that it is possible to represent a larger number. Moreover, by checking such IDs with the database, it is possible to make association with further information. Furthermore, it is possible to efficiently transmit the unique ID because the unique ID is transmitted 10 bits by 10 bits.

4.6) Sixth Example

According to a sixth example of the present invention, a local ID as source identification information, sampling data as measurement information, and partial information on a unique ID as sensor-related information are transmitted by using two or more packets in which packet's data types are changed. In the present example, a unique ID is divided into parts, which are transmitted by using a plurality of packets along with packet numbers corresponding to their order, and a receiving side reconfigures the whole unique ID in accordance with the packet numbers, whereby it is possible to transmit the unique ID of a large number of bits.

Figure 15:
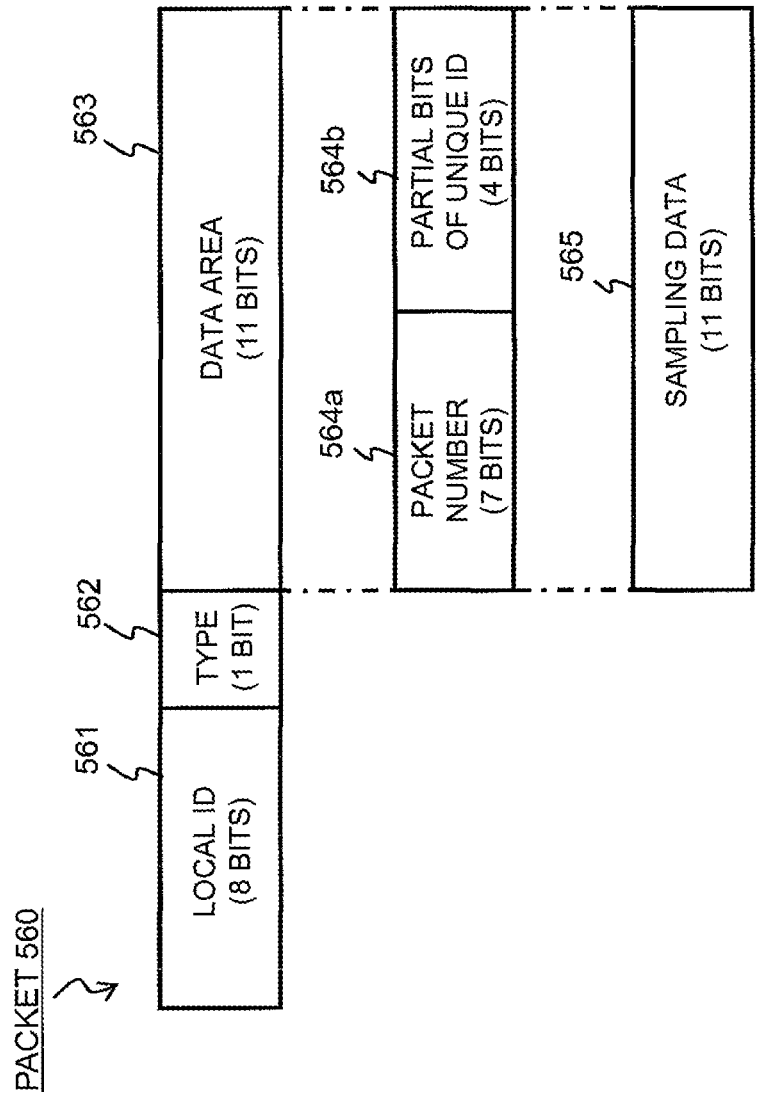
FIG. 15 is a format diagram of a packet to be transmitted by a sensor according to a sixth example of the present invention.

Referring to FIG. 15, a packet 560 includes a local ID 561, a type flag 562, and a data area 563, and the data area 563 includes either partial bits 564b, which are a part of a unique ID, or sampling data 565. Compared with the fifth example in FIG. 13, the packet number is used in place of the start flag, and the other components and the bit length are similar to those of the fifth example, except that the packet number is 7 bits, and the partial bits of the unique ID are 4 bits.

In the sixth example as well, packet transmission and unique ID reconfiguration at the receiving device are performed as shown in FIG. 14. That is, the sensor, in transmission of partial bits of the unique ID, adds a packet number to a packet in order of transmission. The receiving device, in accordance with the order of the packet numbers, sequentially stores the partial bits and reconfigures the unique ID.

Accordingly, in the sixth example of the present invention as well, effects similar to the fourth and fifth examples can be obtained. Moreover, since the order of transmission can be identified based on the packet numbers of packets that transmit the unique ID, it is possible to certainly reconfigure the unique ID without errors.

4.7) Seventh Example

A seventh example of the present invention is similar to the above-described sixth example, except that an error correction code is added.

Figure 16:
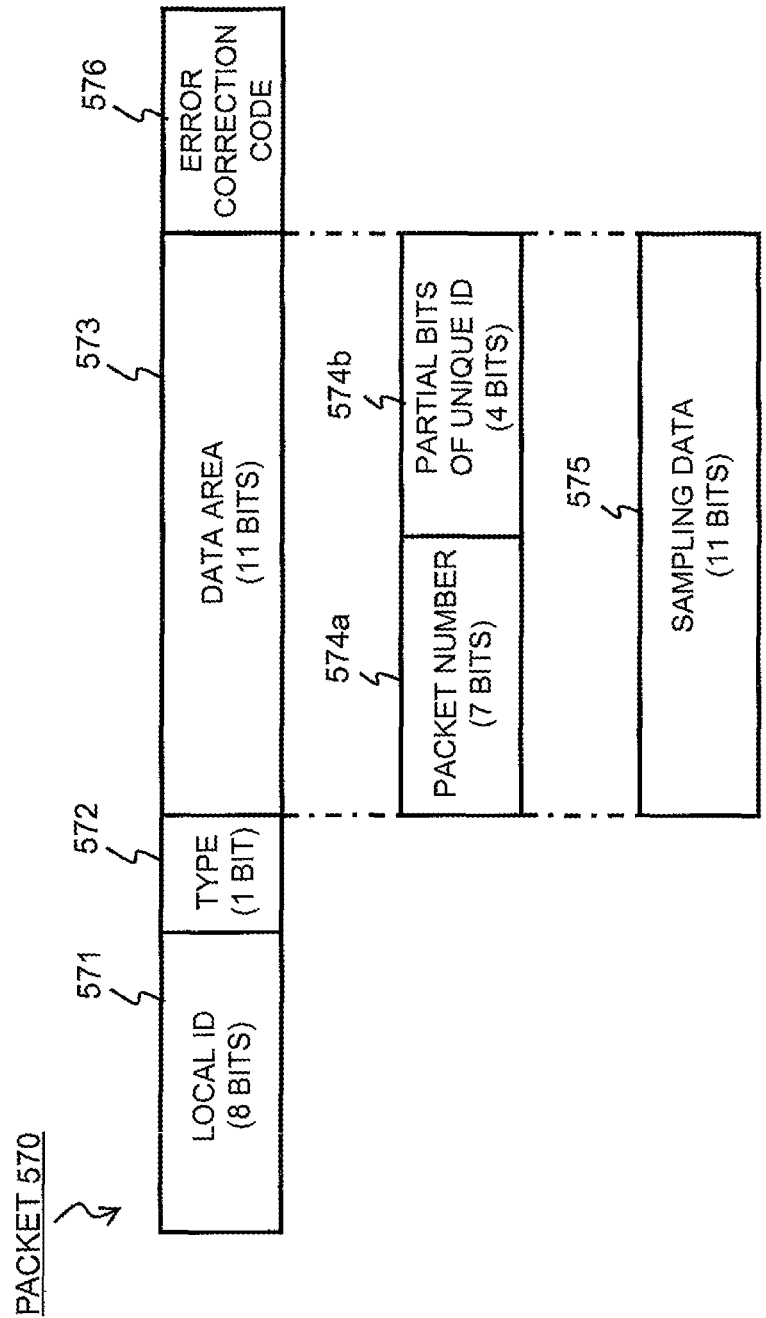
FIG. 16 is a format diagram of a packet to be transmitted by a sensor according to a sixth example of the present invention.

Referring to FIG. 16, a packet 570 includes a local ID 571, a type flag 572, a data area 573, and an error correction code 576, and the configuration of the data area 573 is similar to that of the sixth example shown in FIG. 15. Note that an error correction code can also be added in the fourth and fifth examples shown in FIGS. 11 and 13. For a method for correcting an error using an error correction code, Reed-Solomon codes can be used, but there is no particular limitation.

According to the seventh example of the present invention, since an error in partial bits of the unique ID can be corrected, it is unnecessary to wait for a retransmission of the unique ID, so that it is possible to reduce the time taken to reconfigure the complete unique ID. Moreover, effects similar to the fourth to sixth examples can be obtained, and further since an error in data in the data area can be corrected, it is also possible to correct a transmission error of the sampling data itself.

5. Others

The sensor according to the above-described examples of the present invention is small-sized and can be operated semi-permanently, so that it can be mounted on various equipments. A packet is configured to include an ID unique to a sensor, whereby a large number of equipments can be identified, and services better than mere information about power can be provided. If a management system is connected to an external network, it is possible to, for example, derive information about individual equipments from makers, allowing a user to receive advices on usage and to obtain basic data on the equipments' abnormality diagnoses and the like from the makers. On the other hand, makers can know the actual used states of equipments and can use them to check locations at the time of recall and the like. Moreover, the value of use of the sensor can be dramatically increased if product information itself and information other than current waveforms such as, for example, temperature information can be included.

Note that in each example, it is assumed that the size of a packet is about 100 bits or smaller. This is because as the number of bits increases, the probability of collision increases and therefore practicality will be lost, and if a packet is not smaller than about 100 bits, the advantageous effects of the present invention will be lost because a sufficient number can be represented by unique IDs. Incidentally, an IP address on the Internet is represented by 128 bits in IPv6, and it will suffice if, for example, a unique ID has a length comparable to this at most. Note that the information such as product information, an extended ID, a unique ID, and parts of a unique ID is assumed to be registered within a sensor by being stored in, for example, a nonvolatile memory.

However, the present invention is not limited to the above-described examples but can be appropriately changed without going beyond the scope of the gist thereof. For example, in the fourth and fifth examples of the present invention, it is described that even if packets collide and an ID is lost, reconfiguration will be accomplished in the end because the ID is repeatedly transmitted. However, similar handling can be performed about a loss of sampling data under certain conditions. For example, it is assumed that when a sensor samples waveforms of a current and transmits sampling data to a management system, the assumption can be made that an equipment consuming the current is in the same state for a certain period of time. In this case, it can be regarded that the same current waveforms can be sampled for multiple times during the period of time for which the same state can be assumed. Therefore, lost samples can be supplemented, or its influence can be reduced, by comparing or adding up each sample.

Note that under the same conditions, there is a possibility that packet collision occurs when a plurality of sensors keep transmitting packets at the same timing. In such a case, the probability of packet collision can be reduced by randomly changing the period Ts (see FIG. 7) from the completion of sampling until the transmission of a packet. In another way, the probability of packet collision also can be reduced by randomly determining whether or not to transmit sensor information at every cycle of an AC power supply (in Japan, a period of time represented by the inverse of 50 Hz or 60 Hz).

Moreover, for the sensor according to the present invention, the restrictive conditions are assumed that much information cannot be transmitted at a time because sampling operation and packet transmission operation are alternately performed, and that retransmission control and the like cannot be performed because external control signals are not received. However, the other requirements are not essential. For example, in the above-described examples, wired transmission through a power line is illustrated for a method for data transmission, but wireless transmission can also be used Furthermore, although the packets shown in the second to seventh examples of the present invention include the type flag of 1 bit, types are not necessarily required if any rules to separate sampling data and data other than sampling data (product information, an extended ID, a unique ID, a part of a unique ID, and the like) are determined between the sensor and the receiving device. Further, the data other than sampling data can include various kinds of data, in which case it is possible to increase the number of bits for the type flag.

6. Additional Statements

Part or all of the above-described embodiments can also be stated as in, but is not limited to, the following additional statements.

(Additional Statement 1)

A sensor that repeats a measurement period for performing measurement and a transmission period for performing transmission at predetermined cycles, characterized by comprising:

measurement means that outputs during the measurement period measurement information based on predetermined measurement; and transmission means that transmits during the transmission period, by using a single packet or a plurality of packets, source identification information for identifying a source of a packet, the measurement information, and sensor-related information for identifying the sensor and/or a measurement target equipment of the sensor.

(Additional Statement 2)

The sensor according to additional statement 1, characterized in that the transmission means transmits a first packet including the source identification information and the measurement information and at least one second packet including the source identification information and the sensor-related information.

(Additional Statement 3)

The sensor according to additional statement 1 or 2, characterized in that the sensor-related information is divided into a plurality of second packets and transmitted.

(Additional Statement 4)

The sensor according to any one of additional statements 1 to 3, characterized in that the packets include an error correction code.

(Additional Statement 5)

A receiving device that receives a packet from a sensor that repeats a measurement period for performing measurement and a transmission period for performing transmission at predetermined cycles, characterized by comprising:

reception means that receives from the sensor a single packet or a plurality of packets including source identification information for identifying a source of the packet, measurement information measured by the sensor, and sensor-related information for identifying the sensor and/or a measurement target equipment of the sensor; and identification means that identifies the sensor and/or the measurement target equipment of the sensor based on the source identification information and the sensor-related information received from the sensor.

(Additional Statement 6)

The receiving device according to additional statement 5, characterized in that the reception means receives a first packet including the source identification information and the measurement information and at least one second packet including the source identification information and the sensor-related information.

(Additional Statement 7)

The receiving device according to additional statement 5 or 6, characterized in that the sensor-related information is divided into a plurality of second packets and is reconfigured from the plurality of second packets received.

(Additional Statement 8)

The receiving device according to any one of additional statements 5 to 7, characterized in that the packets include an error correction code.

(Additional Statement 9)

The receiving device according to any one of additional statements 5 to 8, characterized in that the identification means obtains type information corresponding to the received sensor-related information by referring to a database, which stores the sensor-related information and type information corresponding to this sensor-related information, and identifies the sensor and/or the measurement target equipment of this sensor.

(Additional Statement 10)

A sensor system including: a plurality of sensors that are provided to a plurality of electric equipments respectively and perform predetermined measurement; and a receiving device that receives a packet from each sensor, characterized in that each sensor repeats a measurement period for performing measurement and a transmission period for performing transmission at predetermined cycles, and transmits during the transmission period, by using a single packet or a plurality of packets, source identification information for identifying a source of a packet, a measurement result of the measurement, and sensor-related information for identifying the sensor and/or a measurement target equipment of this sensor, and the receiving device receives from the sensors the single packet or the plurality of packets including the source identification information, the measurement result, and the sensor-related information for identifying the sensors and/or the respective electric equipments of the sensors, and identifies the sensors and/or the respective electric equipments of the sensors based on the source identification information and the sensor-related information received.

(Additional Statement 11)

The sensor system according to additional statement 10, characterized in that the sensor transmits a first packet including the source identification information and the measurement information and at least one second packet including the source identification information and the sensor-related information, and the receiving device receives the first packet and the at least one second packet.

(Additional Statement 12)

The sensor system according to additional statement 10 or 11, characterized in that the sensor divides the sensor-related information into a plurality of second packets and transmits them, and the receiving device reconfigures the sensor-related information from the plurality of second packets received.

(Additional Statement 13)

The sensor system according to any one of additional statements 10 to 12, characterized in that the packets include an error correction code.

(Additional Statement 14)

The sensor system according to any one of additional statements 10 to 13, characterized in that the receiving device obtains type information corresponding to the received sensor-related information by referring to a database, which stores the sensor-related information and type information corresponding to this sensor-related information, and identifies the sensors and/or the respective measurement target equipments of the sensors.

INDUSTRIAL APPLICABILITY

The present invention is applicable to a sensor system in which much information cannot be transmitted at a time from a sensor to a receiving device.

REFERENCE SINGS LIST

10 Sensor
11 Measurement section
12 Transmission section
23 Source identification information
24 Measurement information
25 Sensor-related information
30 Receiving device
31 Reception section
32 Identification section
100 Sensor system
101 Projector
102 Television
103 Composite machine
104 Air conditioner
105 Personal computer
106 Distribution board
107 Gateway
108 Power network
109 Internet network
110 Power lines
111 Sensors
112, 113 Current transformers
120 Electric equipment group
200 Sensor
210 Sensor circuit
211 Clock generation circuit
212 Sampling controller
213 ND converter
214 Transmission circuit
220 Interface
300 Receiving device
301 Database
310 Control section
320 Interface

The invention claimed is:

1. A sensor that repeats a measurement period for performing measurement and a transmission period for performing transmission at predetermined cycles, comprising:
a measurement section that outputs during the measurement period measurement information based on predetermined measurement of a target equipment which is one of a group of electric equipments; and
a transmission section that transmits during the transmission period at least one packet including source identification information for identifying a source of the packet in the group of electric equipments, the measurement information, and sensor-related information for identifying the target equipment, wherein a combination of the source identification information and the sensor-related information specifies the target equipment in the group of electric equipments,
wherein the transmission section divides the sensor-related information into a plurality of pieces, and transmits a first packet including the source identification information and the measurement information, and a plurality of second packets each of which includes the source identification information and a corresponding piece of the sensor-related information divided into the plurality of pieces.

2. The sensor according to claim 1, wherein the packet includes an error correction code.

3. A receiving device that receives a packet from a sensor for performing measurement of a target equipment which is one of a group of electric equipments, wherein the sensor repeats a measurement period for performing the measurement and a transmission period for performing transmission at predetermined cycles, comprising:
a reception section that receives from the sensor at least one packet including source identification information for identifying a source of the packet in the group of electric equipments, measurement information measured by the sensor, and sensor-related information for identifying the target equipment of the sensor; and
an identification section that identifies the target equipment in the group of electric equipments based on a combination of the source identification information and the sensor-related information received from the sensor,
wherein the reception section receives a first packet including the source identification information and the measurement information, and a plurality of second packets each of which includes the source identification information and a corresponding piece of the sensor-related information divided into the plurality of pieces, wherein the sensor-related information is divided into a plurality of pieces which are included in respective ones of the plurality of second packets.

4. The receiving device according to claim 3, wherein the packet includes an error correction code.

5. The receiving device according to claim 3, wherein the identification section uses a database to identify a type of the target equipment, wherein the database stores the sensor-related information and type information which are associated with each other.

6. A sensor system comprising:
a plurality of electric equipments, each of which is connected to a distribution board through a power line;
a plurality of sensors that are provided to power lines of a plurality of electric equipments respectively, wherein each sensor performs predetermined measurement of a target equipment which is a corresponding one of the plurality of electric equipments; and
a receiving device that receives packets from each sensor through a corresponding power line, wherein
each sensor repeats a measurement period for performing measurement and a transmission period for performing transmission at predetermined cycles, and transmits during the transmission period at least one packet including source identification information for identifying a source of the packet in the electric equipments, the measurement information, and sensor-related information for identifying the target equipment, wherein a combination of the source identification information and the sensor-related information specifies the target equipment in the electric equipments, and
the receiving device receives from the sensors at least one packet including the source identification information, the measurement result, and the sensor-related information and identifies the target equipment in the electric equipments based on a combination of the source identification information and the sensor-related information received from the sensor,
wherein the sensor transmits a first packet including the source identification information and the measurement information, and a plurality of second packets each of which includes the source identification information and a corresponding piece of the sensor-related information, wherein the sensor-related information is divided into a plurality of pieces which are included in respective ones of the plurality of second packets, and the receiving device receives the first packet and the plurality of second packets.

7. The sensor system according to claim 6, wherein the packets include an error correction code.

8. The sensor system according to claim 6, wherein the receiving device uses a database to identify a type of the target equipment, wherein the database stores the sensor-related information and type information which are associated with each other.

* * * * *